No. 618,658. Patented Jan. 31, 1899.
W. GARLICK, D. MURRAY & A. O. HOWSE.
COMBINATION AX AND CUTTER.
(Application filed Feb. 10, 1898.)
(No Model.)
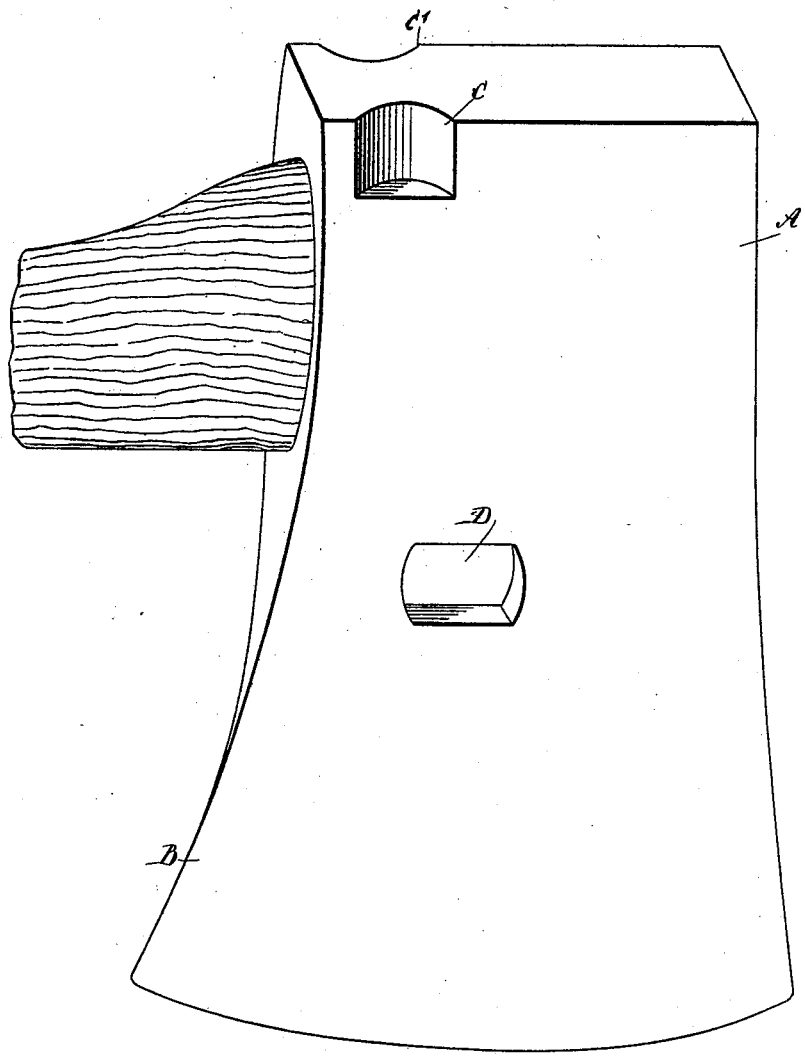
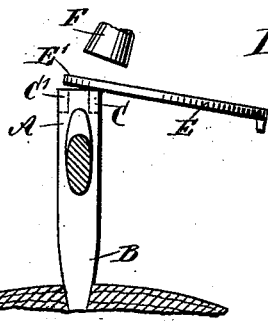
WITNESSES:
Edward Thorpe
Thos. G. Hoskins
INVENTORS
W. Garlick.
D. Murray.
A. O. Howse.
BY
ATTORNEYS.

UNITED STATES PATENT OFFICE.

WILLIAM GARLICK, DAVID MURRAY, AND ALFRED OSWALD HOWSE, OF WINGHAM, NEW SOUTH WALES.

COMBINATION AX AND CUTTER.

SPECIFICATION forming part of Letters Patent No. 618,658, dated January 31, 1899.

Application filed February 10, 1898. Serial No. 669,779. (No model.)

*To all whom it may concern:*

Be it known that we, WILLIAM GARLICK, DAVID MURRAY, and ALFRED OSWALD HOWSE, of Wingham, Manning River, New South Wales, Australia, have invented a new and Improved Combination Ax and Cutter, of which the following is a full, clear, and exact description.

The object of the invention is to provide a new and improved combined ax and cutter arranged to permit of using the tool as an ordinary ax or as a cutter for horseshoe-heels.

The invention consists in the novel construction of the tool hereinafter described and claimed.

Reference is to be had to the accompanying drawings, forming a part of this specification, in which similar characters of reference indicate corresponding parts in both views.

Figure 1 is a perspective view of the improvement, and Fig. 2 is a vertical end elevation with the handle in section and a horseshoe in position to be struck by a hammer.

The tool illustrated in the drawings is provided with a head A and a bit B, of which the head A is case-hardened or has a quantity of steel welded in the head at the rear top edge thereof to allow of forming cutters C C' therein for cutting off horseshoe-heels at the time the ax is, with the bit, driven into a log or a like support, so as to enable the operator to place the horseshoe E in position on the cutters and by striking with the hammer F, as shown in Fig. 2, to cut a portion off the horseshoe-heel E'. The cutters C C' are thus integral with the head of the ax and are made in the form of recesses of segmental shape, as is plainly indicated in Fig. 1, to produce the desired cutting edges.

The head of the ax is of substantially uniform thickness except at the notches which form the cutters. Thus the head is of sufficient strength to allow of its being used after the fashion of a hammer for delivering heavy blows. The bit B forms a wedge by which the tool may be fastened to a suitable support, such as a log. The ax is also provided with an oblong aperture D through the portion between the bit and the eye, the aperture extending transversely and its longer dimension being substantially parallel to the edge of the bit for receiving either end of a hackney horseshoe to allow of bending the same at any place into the desired shape without heating to fit the horseshoe to the hoof of the animal.

It is understood that when the horseshoe is inserted in the aperture the operator by the use of a hammer can strike a blow upon the shoe and bend the latter at the desired point until the desired shape is obtained.

The tool is especially serviceable for the use of farmers, teamsters, or the like for shoeing their horses when the shoes are obtained from general store-keepers and are usually of one shape and have to be cut and bent to fit the hoofs of the horses.

Having thus fully described our invention, we claim as new and desire to secure by Letters Patent—

1. A tool having a sharp, wedge-shaped edge by which it may be fastened to a suitable support, and a thickened edge at the opposite side to said sharp edge, said thickened edge being reduced in width for a small portion of its length, forming cutters while the main portion of the said edge is broad, substantially as described.

2. A tool having a sharp, wedge-shaped edge by which it may be fastened to a suitable support, and a thickened edge at the opposite side to said sharp edge, said thickened edge having upon opposite sides, approximately semicylindrical recesses whose axes are approximately perpendicular to the said edges, forming cutters upon the said thickened edge.

WILLIAM GARLICK.
DAVID MURRAY.
ALFRED OSWALD HOWSE.

Witnesses:
L. B. HEDLEY,
F. A. JOHNSTON.